United States Patent [19]

Nishikawa

[11] Patent Number: 5,521,897
[45] Date of Patent: May 28, 1996

[54] DOUBLE BEAM OPTICAL HEAD

[75] Inventor: Koichiro Nishikawa, Takasaki, Japan

[73] Assignee: Canon Kabushiki Kaisha, Tokyo, Japan

[21] Appl. No.: 527,381

[22] Filed: Sep. 13, 1995

Related U.S. Application Data

[63] Continuation of Ser. No. 227,401, Apr. 14, 1994, abandoned.

[30] Foreign Application Priority Data

Apr. 22, 1993 [JP] Japan .................................. 5-117658
Mar. 15, 1994 [JP] Japan .................................. 6-043647

[51] Int. Cl.⁶ .......................................... G11B 7/00
[52] U.S. Cl. .................... 369/11.6; 369/100; 369/110; 369/112
[58] Field of Search .................... 369/116, 110, 369/112, 118, 100

[56] References Cited

U.S. PATENT DOCUMENTS

| | | | |
|---|---|---|---|
| 4,641,296 | 3/1987 | Mizunoe et al. | 369/46 |
| 4,654,839 | 3/1987 | Eado | 369/46 |
| 5,329,517 | 7/1994 | Yamaguchi et al. | 369/110 |
| 5,379,285 | 1/1995 | Sugiura | 369/100 |

FOREIGN PATENT DOCUMENTS 64-82348  3/1989  Japan.

*Primary Examiner*—David C. Nelms
*Assistant Examiner*—Huan Hoang
*Attorney, Agent, or Firm*—Fitzpatrick, Cella, Harper & Scinto

[57] ABSTRACT

A double beam optical head is so arranged that at least two optical beams are guided into an objective lens to be focused thereby to form at least two optical spots on an optical information recording medium and that two optical spots among optical spots are used to record and/or reproduce information with respect to the optical information recording medium. An optical system includes the objective lens and a light source for producing the two optical beams. The optical system is so arranged that, in guiding the two optical beams into the objective lens, the centers of the intensity distributions of the two optical beams are approximately symmetrically located with each other with respect to the optical axis of the objective lens. A magneto-optical recording and/or reproducing apparatus may be constructed of the optical head and a magnetic head for applying a magnetic field to the magneto-optical recording medium.

23 Claims, 13 Drawing Sheets

DOUBLE BEAM OPTICAL HEAD

This application is a continuation of application Ser. No. 08/227,401 filed Apr. 14, 1994, now abandoned.

BACKGROUND OF THE INVENTION

1. Field of the Invention

The present invention relates to a double beam optical head. The double beam optical head of the present invention can be applied to an optical head which forms two optical spots on a single information track or a recording medium to perform simultaneous recording and reproduction or to an optical head which forms optical spots on two respectively associated information tracks in a recording medium to perform parallel recording and/or reproduction.

2. Related Background Art

There has been suggested conventional optical heads used in magneto-optical recording/reproducing apparatus, such as an optical head which can perform simultaneous data recording and reproduction (read-while-write) while forming two optical spots on a single information track on a magneto-optical disc or an optical head which can perform parallel data recording and/or reproduction (parallel write/read) while forming optical spots on two information tracks, respectively, in a magneto-optical disc. An example of such optical head is one as described in Japanese Laid-open Patent Application No. 64-82348. FIG. 1 shows the scheme of the optical head as described in the Japanese application. It is an optical head for read-while-write to perform simultaneous recording and reproduction while forming two optical spots on one information track.

In FIG. 1, an optical beam emitted from a semiconductor laser 1 is collimated by a collimating lens 2 and the collimated beam is split into three optical beams by a diffraction grating 3. These optical beams pass through a beam shaping prism 5 and a beam splitter 6 and are then condensed by an objective lens 7 so as to be focused on a magneto-optical disc 8. Light reflected on the magneto-optical disc 8 is again condensed by the objective lens 7 and is then reflected by the beam splitter 6. The reflected light passes through a half wave plate 10, a condenser lens 11 and a beam splitter 12 to be received by photodetectors 13, 14. A servo signal and an RF signal are obtained from outputs from the photodetectors 13, 14. Numeral 9 designates a magnetic head which can apply a modulation magnetic field to the magneto-optical disc 8.

Light spots formed on the magneto-optical disc 8 are located on a same information track in the graph as shown in FIG. 2. Namely, an optical spot SP1, corresponding to an optical beam on the optical axis of the objective lens 7, has a larger quantity of light than the two other spots SP2, SP3. In this conventional example the optical spot SP1 is zeroth order diffracted light emerging from the diffraction grating 3. Thus, the optical spot SP2 corresponding to first order diffracted light has a smaller quantity of light than the optical spot SP1. The two optical spots SP1, SP2 are so arranged that the optical spot SP1 advances and the optical spot SP2 follows on the same information track moving in the direction as shown by the arrow. In recording information the optical spot SP1 is formed with a predetermined recording power and the magnetic head 9 applies a magnetic field modulated by data information to a recording area. At the same time, reproduction is conducted with the optical spot SP2 to check (or verify) recorded information just after the recording with the optical spot SP1. Also, the optical spot SP1 is formed with a reproduction power in normal information reproduction.

In the optical head as described above, a reproduction signal for verification by the optical spot SP2 is used to check a recorded signal. It is, therefore, preferred that the quality of reproduced signal for verification is kept at a same level as that of the reproduced signal in normal reproduction. In the conventional example the three optical beams are separated from each other at the diffraction grating 3 and start traveling at different angles. Generally, the distribution of a beam incident on the objective lens can be assumed to have a substantially Gaussian distribution. Then the optical beams entering the objective lens 7 have respective intensity distributions as shown in FIG. 3. The intensity center of distribution Bm1 corresponding to the optical spot SP1 is coincident with the optical axis of the objective lens 7, while the intensity center of distribution Bm2 corresponding to the optical spot SP2 deviates by a distance d from the optical axis of the objective lens 7. In other words, a deviation amount $\delta$, which is a distance from the optical axis of the objective lens 7 to the center of intensity distribution of optical beam, is 0 for distribution Bm1 and d for distribution Bm2.

FIG. 4 shows a relation between a deviation amount $\delta$ and the size of the optical spot in the direction of deviation. In the conventional example as described above, $\delta=d$ for distribution Bm2 corresponding to the optical spot SP2, which corresponds to C as a spot diameter of optical spot SP2, relatively large as compared with B for the spot diameter of optical spot SP1. Accordingly, the quality of the reproduced signal from the optical spot SP2 is inferior to that from the optical spot SP1.

This is also the case in read-while-write or in parallel record/reproduction without using the diffraction grating but using array lasers to form two optical beams.

SUMMARY OF THE INVENTION

It is, therefore, an object of the present invention in view of the above-described problem in the conventional technology to provide a double beam optical head which can obtain two optical spots nearly equivalent in quality.

The present invention provides a double beam optical head, achieving the above object, which is so arranged that at least two optical beams are guided into an objective lens to be focused thereby to form at least two optical spots on an optical information recording medium and that two optical spots among these optical spots are used to record and/or reproduce information with respect to said optical information recording medium, wherein an optical system comprising the objective lens and a light source for producing the two optical beams is so arranged that in guiding the two optical beams into the objective lens, the centers of intensity distributions of the two optical beams are approximately symmetrically located with respect to the optical axis of the objective lens.

In the present invention, the recording and/or reproduction with respect to the optical information recording medium may be the read-while-write in which recording and reproduction are simultaneously performed while forming two optical spots on an information track or the parallel record/reproduction in which recording and/or reproduction are performed in parallel while forming optical spots on two information tracks, respectively.

DETAILED DESCRIPTION OF THE PREFERRED EMBODIMENTS

Specific embodiments of the present invention will be described with reference to the accompanying drawings.

Figure 5:
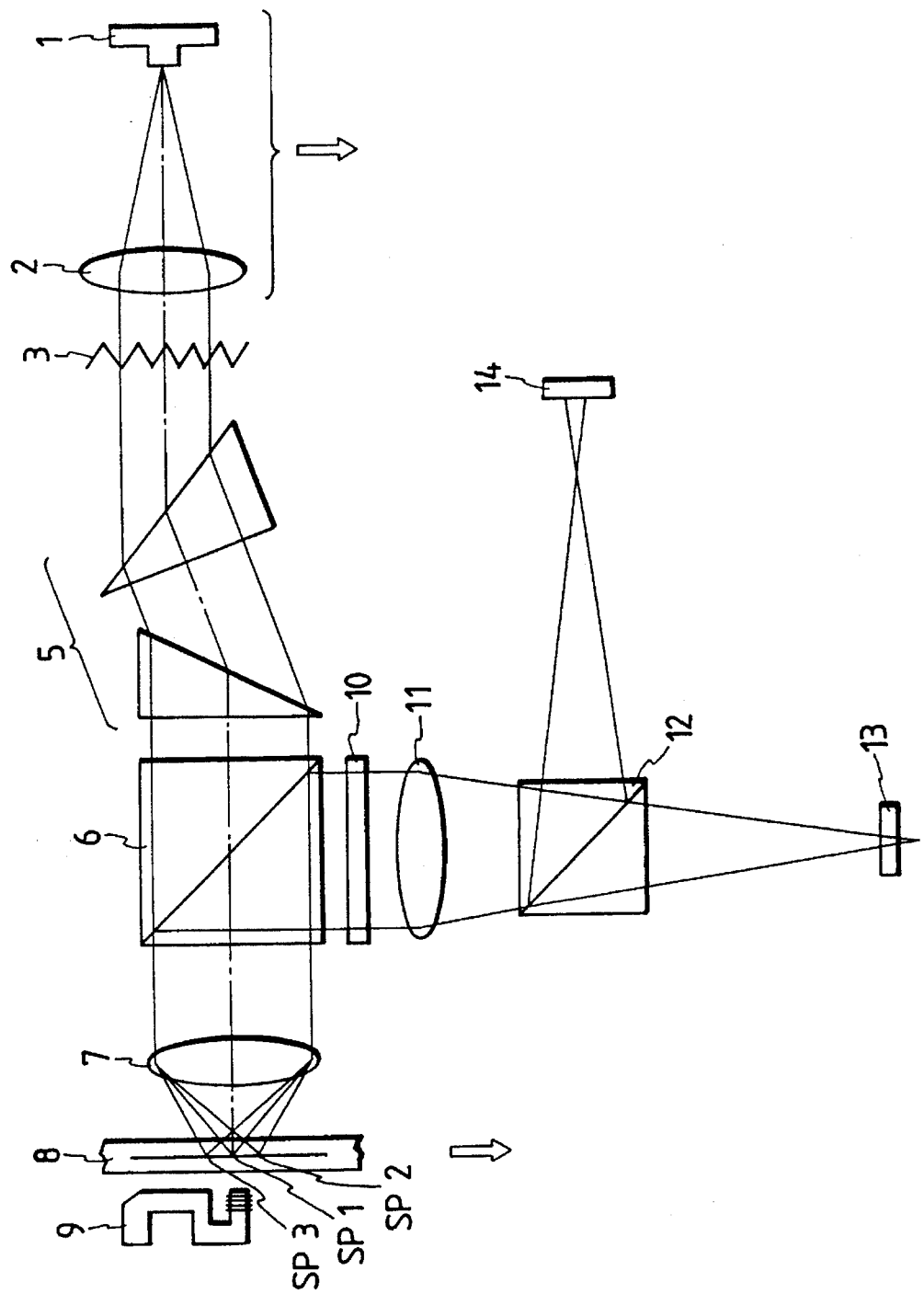
FIG. 5 is a drawing to show a schematic view of an optical head in a first embodiment of the present invention.

FIG. 5 shows a schematic view of the first embodiment of optical head according to the present invention. The optical head is one for read-while-write, which is used in a magneto-optical recording/reproducing apparatus.

In FIG. 5, an optical beam emitted from a semiconductor laser 1 is collimated by a collimating lens 2 and the collimated beam is split into three optical beams by a diffraction grating 3. These optical beams pass through a beam shaping prism 5 and a beam splitter 6 and then condensed by an objective lens 7 so as to be focused on a magneto-optical disc 8. Light reflected from the magneto-optical disc 8 is again condensed by the objective lens 7 and is then reflected by the beam splitter 6. The reflected light passes through a half wave plate 10, a condenser lens 11 and a beam splitter 12 to be received by photodetectors 13, 14. A servo signal and an RF signal are obtained from outputs from the photodetectors 13, 14. Numeral 9 designates a magnetic head which can apply a modulation magnetic field to the magneto-optical disc 8.

Light spots formed on the magneto-optical disc 8 are located on the same information track. The optical spot SP1 corresponding to the center optical beam is zeroth order diffracted light emerging from the diffraction grating 3. Thus, the optical spots SP2, SP3 corresponding to first order diffracted light have a smaller quantity of light than the optical spot SP1. The two optical spots SP1, SP2 are so arranged that the optical spot SP1 advances and the optical spot SP2 follows on the same information track moving in the direction as shown by the arrow. In recording information the optical spot SP1 is formed with a predetermined recording power and the magnetic head 9 applies a magnetic field modulated by data information to a recording area. At the same time, reproduction is conducted with the optical spot SP2 to check (or verify) recorded information just after the recording with the optical spot SP1. Also, the optical spot SP1 is formed with a reproduction power in normal information reproduction.

Figure 6:
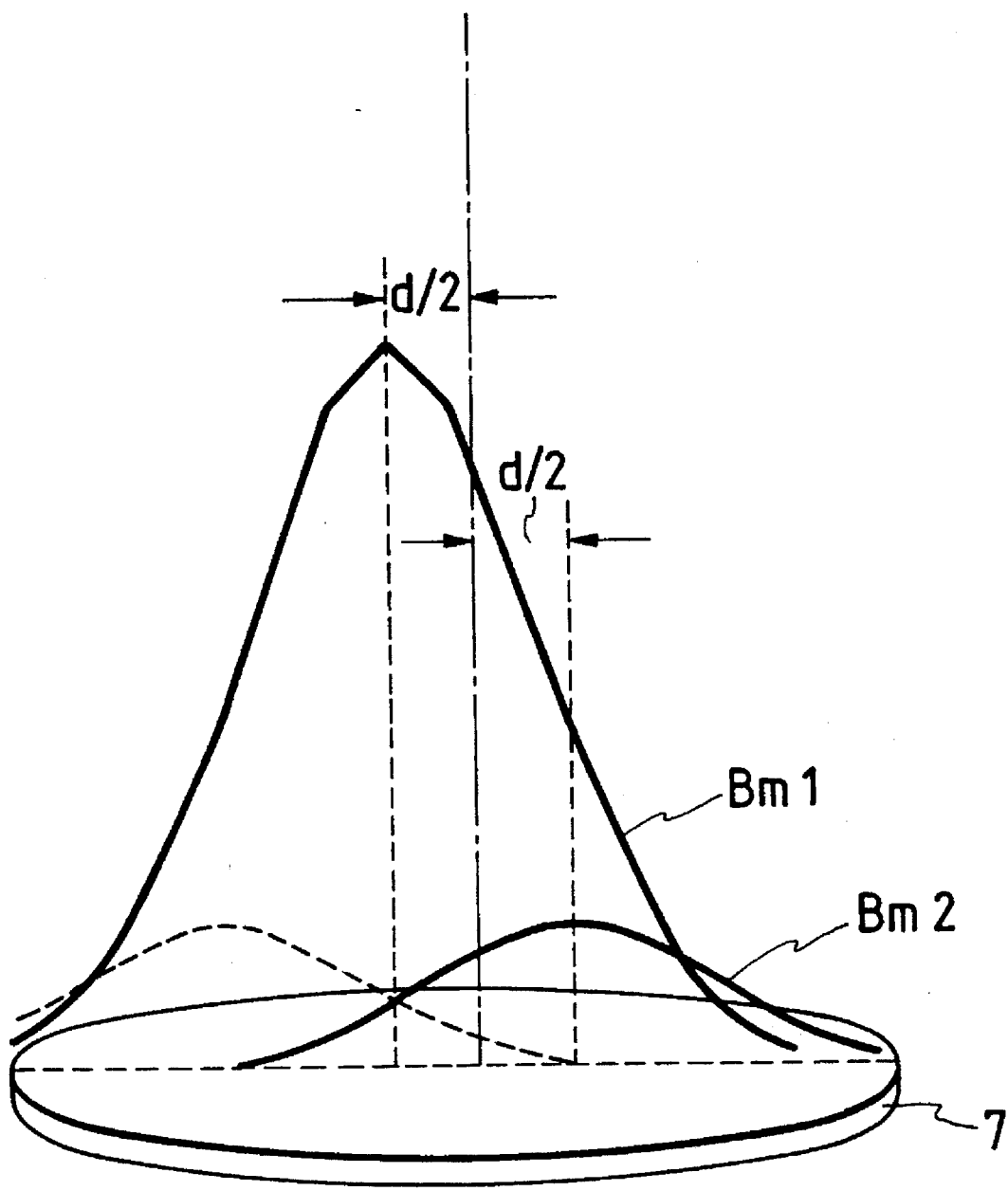
FIG. 6 is a drawing to show the intensity distributions of optical beams incident into an objective lens in the optical head according to the present invention.

In the present embodiment, the optical beams entering the objective lens 7 have the intensity distributions as shown in FIG. 6. Namely, the intensity center of distribution Bm1 corresponding to the optical spot SP1 is deviates by a distance d/2 from the optical axis of objective lens 7, while the intensity center of distribution Bm2 corresponding to the optical spot SP2 deviates by a distance d/2 in the opposite direction from the optical axis of objective lens 7. In other words, the centers of intensity distributions Bm1 and Bm2 of the optical beams are approximately symmetrically located with respect to the optical axis of objective lens 7. This symmetric arrangement can be achieved by shifting the semiconductor laser 1 and the collimating lens 2 by a suitable distance from the arrangement of the conventional example in FIG. 1 in parallel in the direction perpendicular to the direction of the optical axis, as shown in FIG. 5. Alternatively, the symmetric arrangement can be realized by inclining the semiconductor laser 1 and the collimating lens 2 at a suitable angle to the optical axis.

Figure 4:
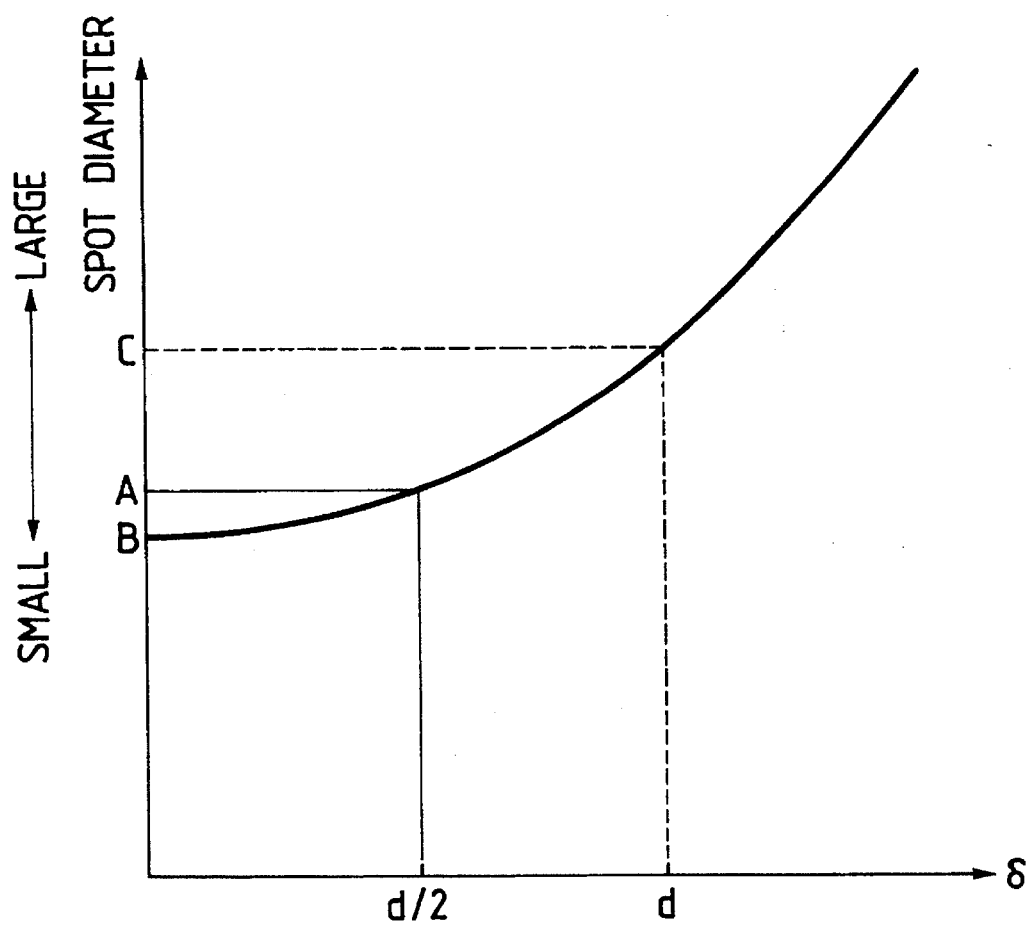
FIG. 4 is a drawing to show the relation between the deviation amount, which is the distance from the optical axis of objective lens to the center of intensity distribution of optical beam, and the size of optical spot in the direction of deviation.

Accordingly, the present embodiment has the distribution Bm1 and the distribution Bm2 both with deviation amount $\delta$ of d/2 from the optical axis of objective lens 7 to the center of intensity distribution of optical beam, so that the spot diameter of each optical spot SP1, SP2 is A as shown in FIG. 4. In addition, the value of A is not far different from the spot diameter B in an ideal case.

An example will be described with specific numerical values. An effective diameter of the objective lens 7 is defined as D. An optical beam intensity distribution is assumed to have a value $1/e^2$ as normalized with the center intensity at a distance D/2 from the center with the intensity center at the origin. Let the numerical aperture of the objective lens 7 be 0.55 and the wavelength of optical beam be 790 nm. Further, let d=D/4. Then, A=1.37 μm, B=1.32 μm and C=1.53 μm in this case.

As described above, the present invention provides a double beam optical head which is so arranged that at least two optical beams are guided into an objective lens to be focused thereby to form at least two optical spots on an optical information recording medium and that two optical spots among these optical spots are used to record and/or reproduce information with respect to said optical information recording medium, wherein an optical system comprising the objective lens and a light source for producing the two optical beams is so arranged that in guiding the two optical beams into the objective lens, the centers of intensity distributions of the two optical beams are approximately symmetrically located with respect to the optical axis of the objective lens.

Figure 7:
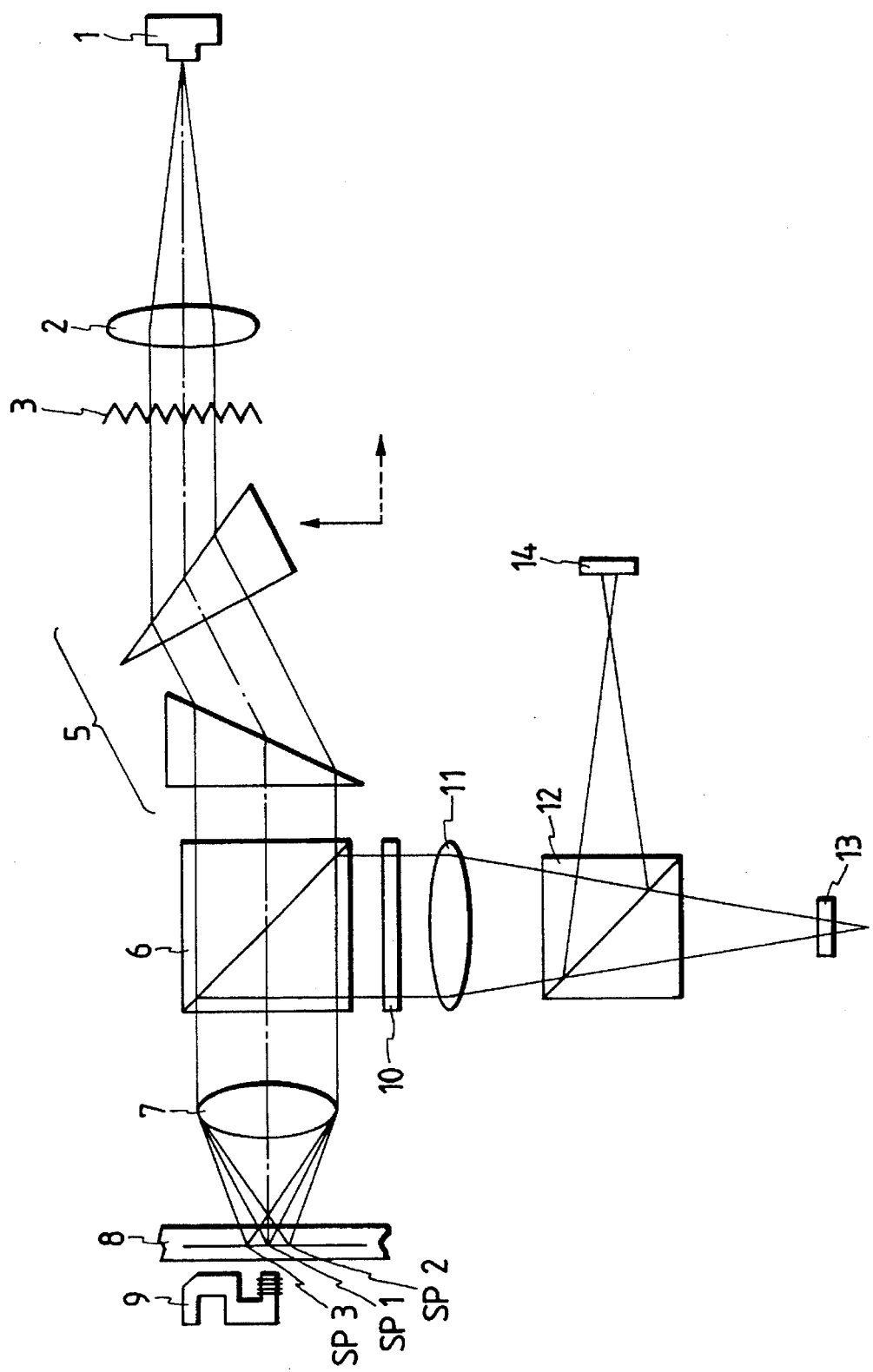
FIG. 7 is a drawing to show a schematic view of an optical head in a second embodiment of the present invention.

FIG. 7 shows a schematic view of the second embodiment of the optical head according to the present invention.

Figure 1:
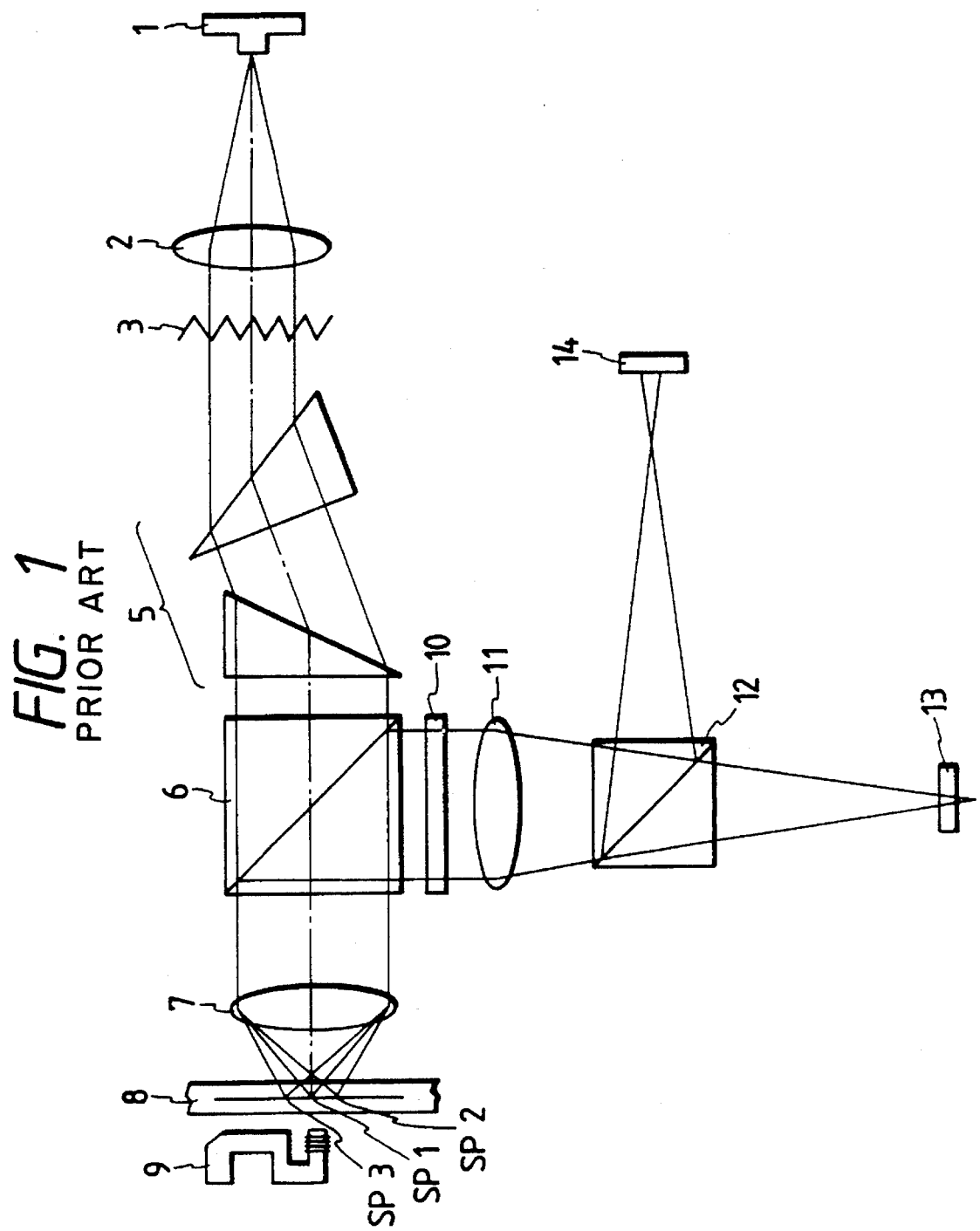
FIG. 1 is a drawing to show a schematic view of a conventional optical head.
Figure 2:
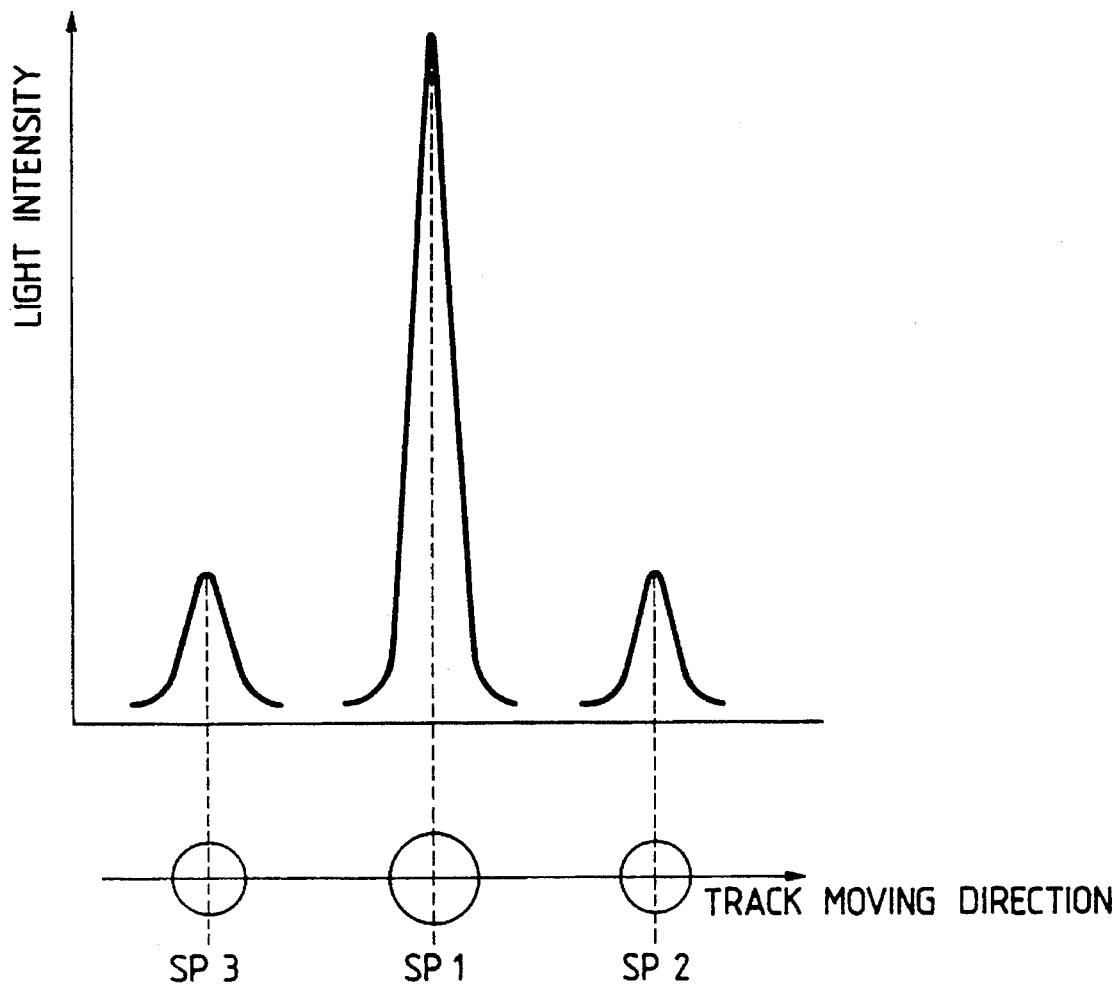
FIG. 2 is a drawing to show the relation between optical spots and an information track.
Figure 3:
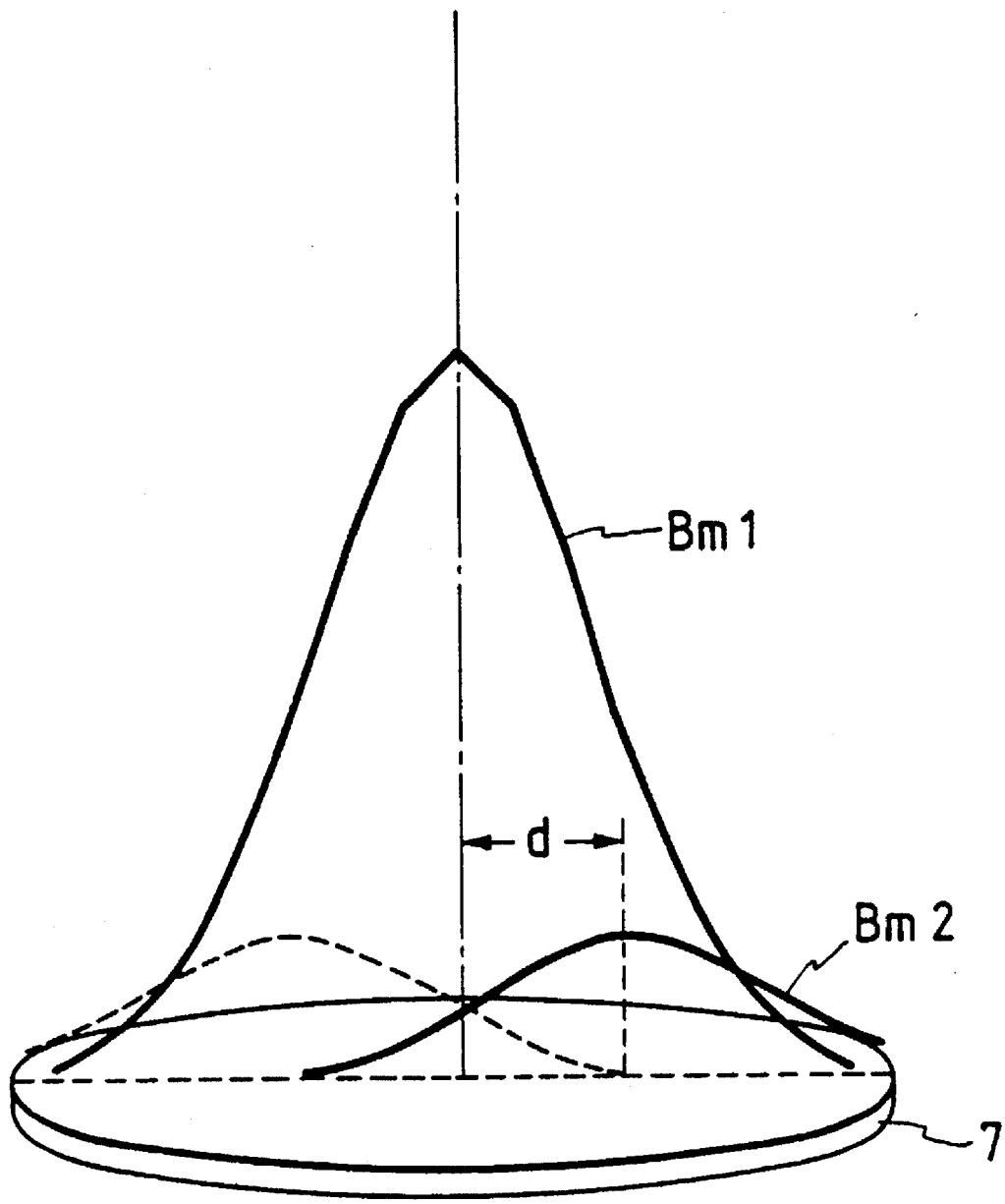
FIG. 3 is a drawing to show the intensity distributions of optical beams incident into an objective lens in the optical head of FIG. 1.
Figure 8:
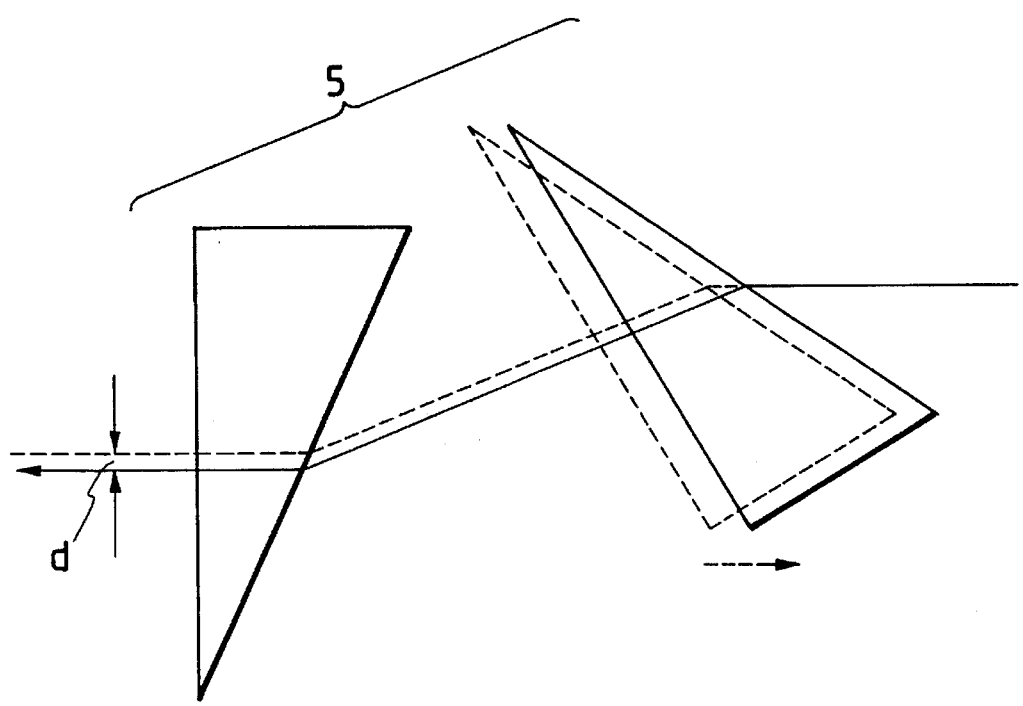
FIG. 8 is a drawing to show the operation of a second embodiment of the present invention.
Figure 9:
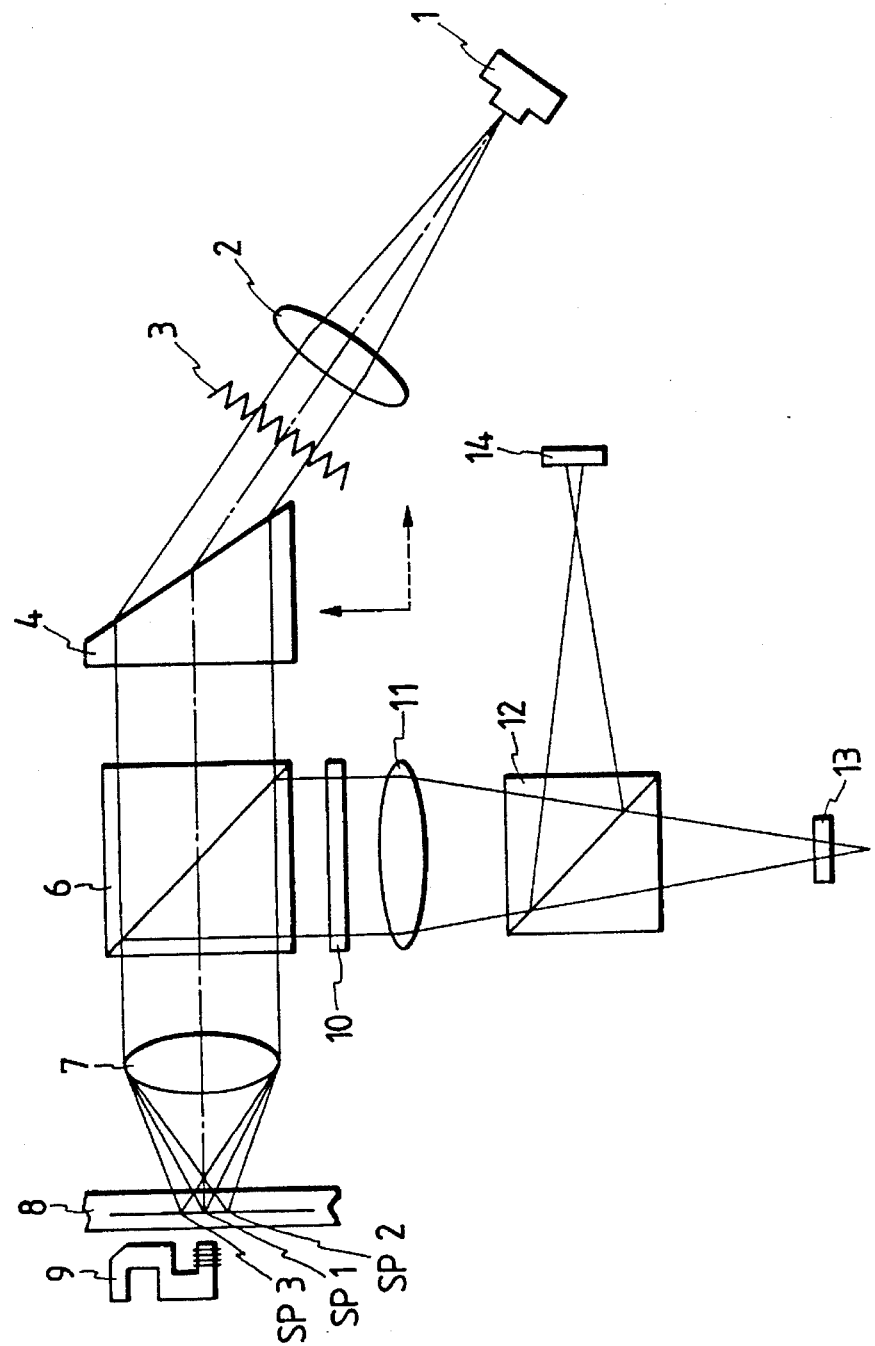
FIG. 9 is a drawing to show a schematic view of an optical head in a modification of the second embodiment of the present invention.
Figure 10:
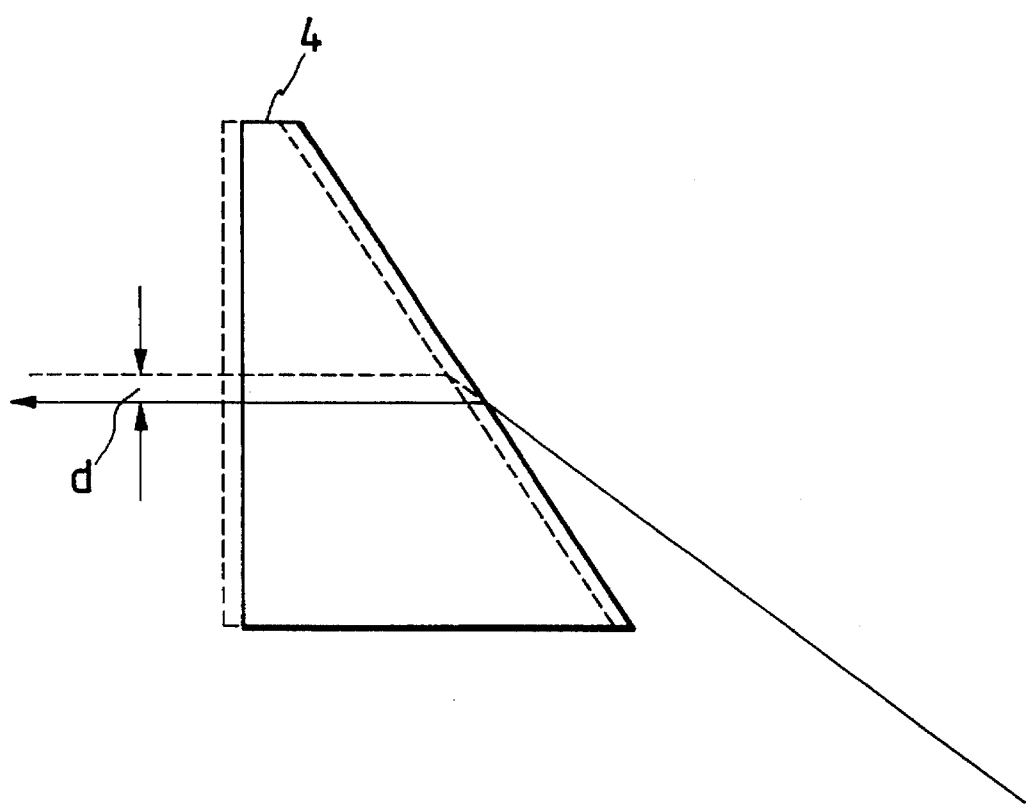
FIG. 10 is a drawing to show the operation of the modification shown in FIG. 9.

The present embodiment attains the same effect as the first embodiment by movement of the intensity distributions by moving a prism on the diffraction grating 3 side in the beam shaping prism 5 by a suitable distance p in a direction perpendicular to the direction of the optical axis and/or in the direction of the optical axis in parallel from the location in the conventional example of FIG. 1 in the direction as shown by the solid-line arrow in FIG. 7 with the operation shown in FIG. 8. The prism may be shifted in the direction shown by the dotted-line arrow in the drawing or in a synthetic direction of the solid-line arrow and the dotted-line arrow. Alternatively, a prism on the beam splitter 6 side in the beam shaping prism 5 may be shifted in a direction opposite to the above direction in the case of the prism on the diffraction grating 3 side. Furthermore, a modification may be arranged as shown in FIG. 9, in which an integral beam shaping prism 4 replaces the beam shaping prism 5 and the movement of the intensity distributions is achieved by moving the prism 4 by a suitable distance d in parallel in the direction perpendicular to the direction of the optical axis, as shown by the solid-line arrow in the drawing with the operation as shown in FIG. 10. Alternatively, the prism 4 may be shifted in the direction of the optical axis as shown by the dotted-line arrow or in a synthetic direction of the solid-line arrow and the dotted-line arrow similarly as in the case of FIG. 7.

The first embodiment is not suitable for adjustment after completion of the optical system, because the light source portion is moved, which greatly influences the entire optical system. In contrast, the method of moving the beam shaping prism as described in the second embodiment is advantageously suitable for fine adjustment after completion of the optical system.

Figure 11:
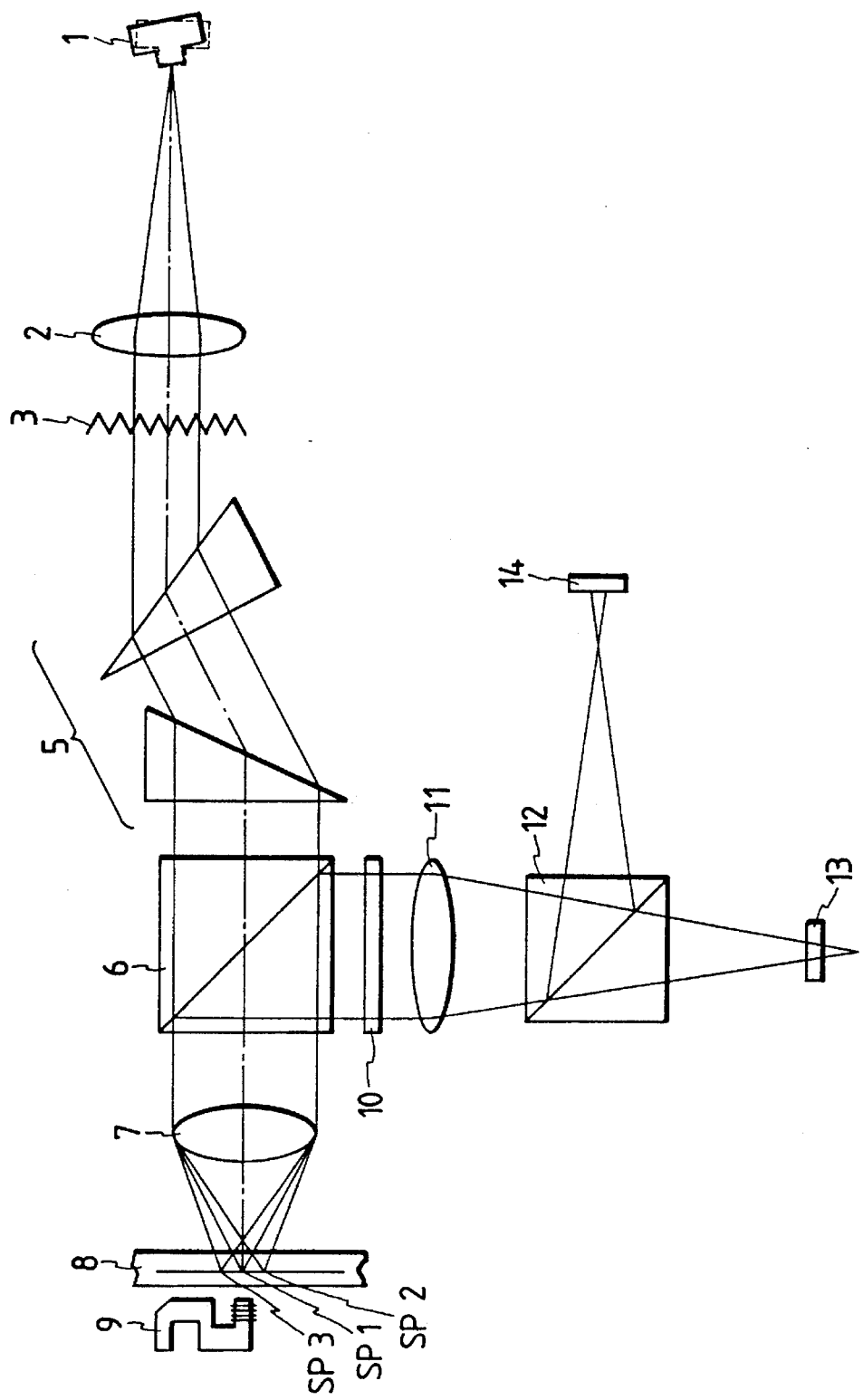
FIG. 11 is a drawing to show a schematic view of an optical head in a third embodiment of the present invention.

FIG. 11 shows a schematic view of the third embodiment of optical head according to the present invention.

Figure 12:
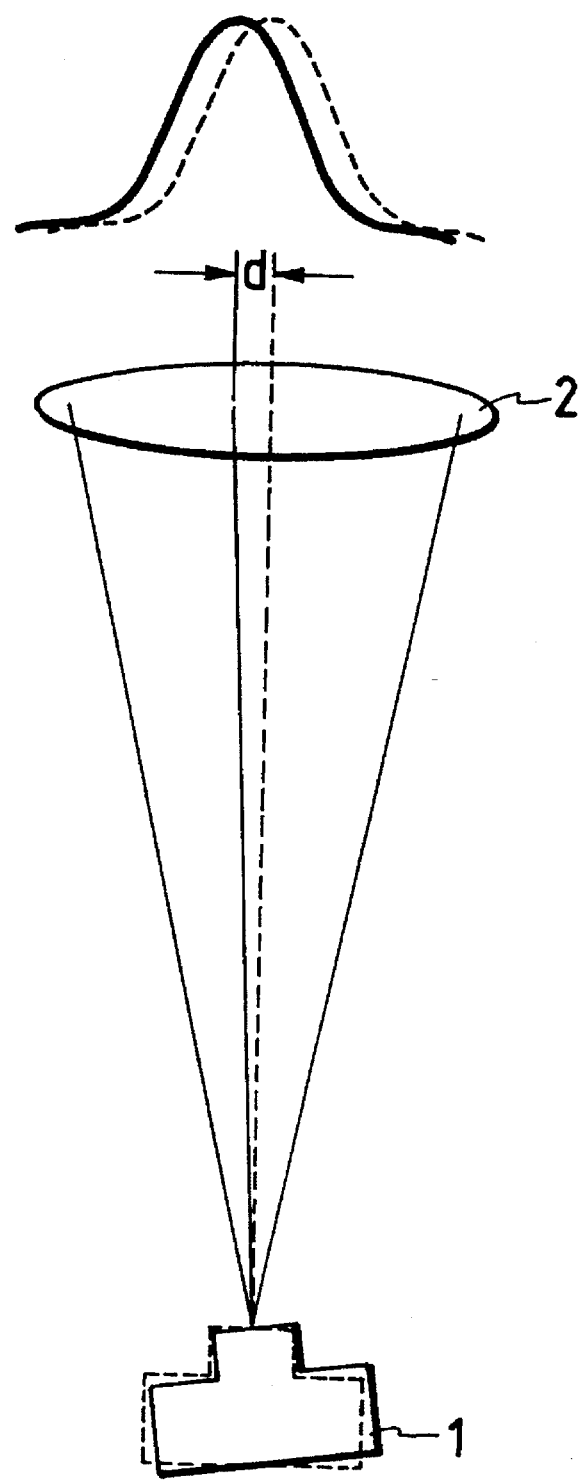
FIG. 12 is a drawing to show the operation of the third embodiment of the present invention.

In the present embodiment the semiconductor laser 1 is inclined at a suitable angle relative to the optical axis of the collimating lens 2 from the arrangement in the conventional example of FIG. 1. Inclining the semiconductor laser 1 also inclines rays corresponding to the centers of the intensity distributions, as shown in FIG. 12 and, when the rays are collimated by the collimating lens 2, they emerge therefrom with movement of the intensity distributions. This can achieve the same effect as in the first and second embodiments as described above. Different from the first and second embodiments as described above, the present embodiment can be constructed in apparently the same arrangement as the setup in the conventional example of FIG. 1. Thus, the present embodiment has an advantage that it can be arranged as compact.

The above embodiments showed examples in which two optical beams were formed using a diffraction grating, but the present invention may employ such an arrangement that two optical beams are formed using array lasers.

Figure 13:
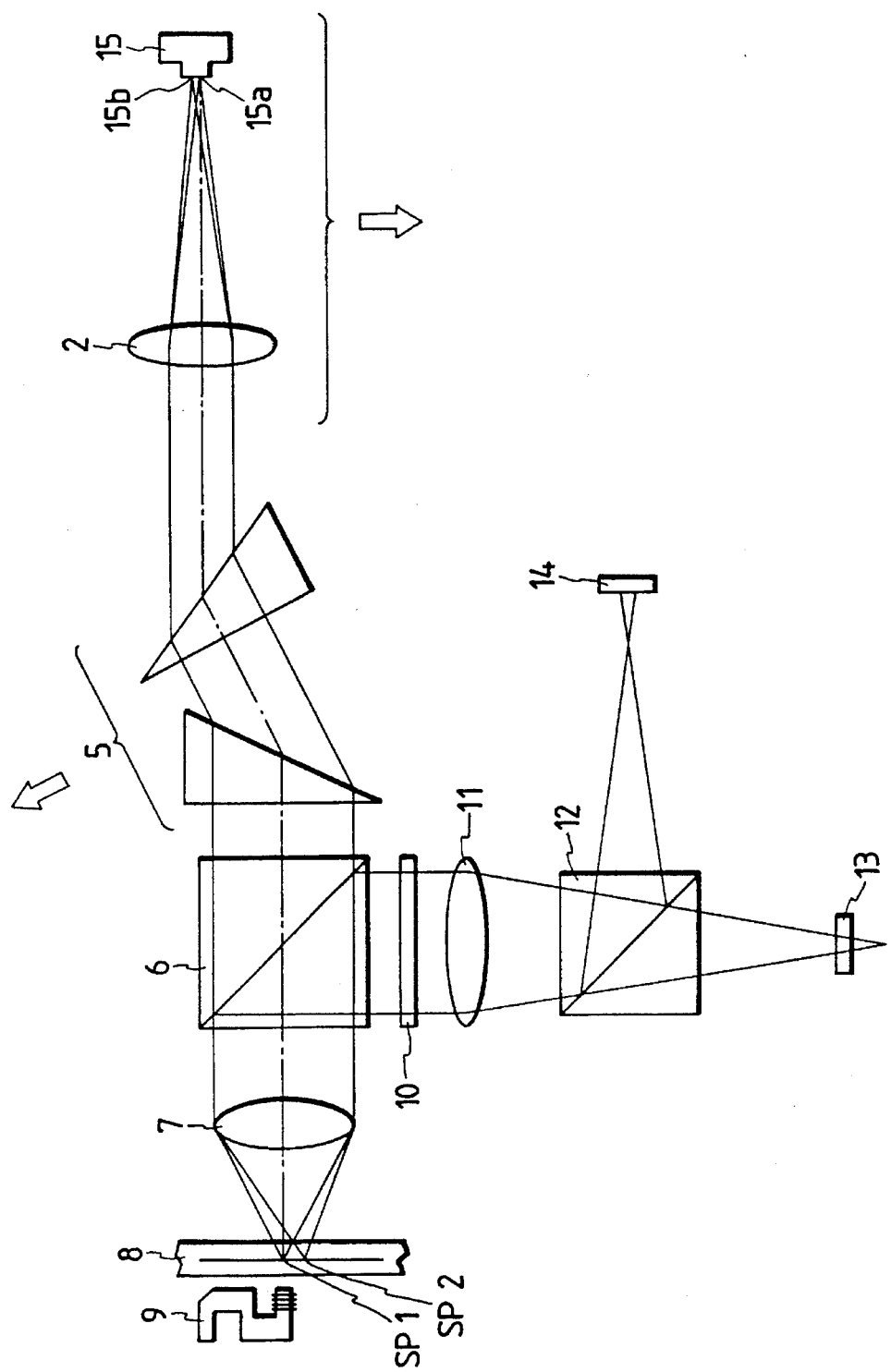
FIG. 13 is a drawing to show a schematic view of an optical head in a fourth embodiment of the present invention.

FIG. 13 shows a schematic view of the fourth embodiment of optical head according to the present invention.

The present embodiment employs a semiconductor laser array 15 in place of the combination of semiconductor laser 1 and diffraction grating 3, as shown in FIG. 11. In the present embodiment the movement of intensity distributions is effected by moving a pair of semiconductor laser array 15 and collimating lens 2 in a direction perpendicular to the direction of the optical axis, as shown in FIG. 13, or by moving a beam shaping prism 5. The present embodiment is advantageous in that it can be applicable to the optical modulation recording, different from the first to third embodiments as described above. Although light from a radiative point 15a is arranged to be located on the optical axis in FIG. 13, light from the radiative point 15a and light from a radiative point 15b can be arranged as symmetric with each other with respect to the optical axis.

As detailed above, the double beam optical head of the present invention has the optical system arranged such that the centers of intensity distributions of two optical beams are arranged as symmetric with each other with respect to the optical axis of objective lens, which can supply two optical spots focused by the objective lens with nearly same quality and which can keep the quality of reproduced signals by the respective optical spots nearly identical. In addition, the quality of the reproduced signals can bear comparison with that of an optical spot with the center of intensity distribution on the optical axis of objective lens.

What is claimed is:

1. A double beam optical head comprising:

first optical means for emitting a first light beam and a second light beam; and second optical means for focusing the first and second light beams from said first optical means on an optical information recording medium to form a first light spot and a second light spot in association with the first light beam and the second light beam, respectively, wherein said first optical means is arranged such that the center of the intensity distribution of the first light beam incident on said second optical means and the center of the intensity distribution of the second light beam incident on said second optical means are approximately symmetrically located with respect to the optical axis of said second optical means.

2. A double beam optical head according to claim 1, wherein said second optical means is an objective lens.

3. A double beam optical head according to claim 1, wherein said first optical means includes a light source, a collimating optical system for making the light beam emitted from the light source a parallel beam, and dividing means for dividing the light beam from the collimating optical system into a plurality of light beams, wherein the centers of the intensity distributions of two light beams from said first optical means are approximately symmetrically located with respect to the optical axis of said second optical means by moving said light source and said collimating optical system in parallel in a direction perpendicular to the optical axis of said second optical means.

4. A double beam optical head according to claim 1, wherein said first optical means includes a light source, a collimating optical system for making the light beam emitted from the light source a parallel beam, and dividing means for dividing the light beam from the collimating optical system into a plurality of light beams, wherein the centers of the intensity distributions of two light beams from said first optical means are approximately symmetrically located with respect to the optical axis of said second optical means by inclining said light source and said collimating optical system with respect to the optical axis of said second optical means.

5. A double beam optical head according to claim 1, wherein said first optical means includes a light source, a collimating optical system for making the light beam emitted from the light source a parallel beam, dividing means for dividing the light beam from the collimating optical system into a plurality of light beams, and a beam shaping optical system for shaping the plurality of light beams from said system for shaping the plurality of light beams from said dividing means, wherein the centers of the intensity distributions of two light beams from said first optical means are approximately symmetrically located with respect to the optical axis of said second optical means by moving said beam shaping optical system in a direction parallel to the optical axis of said second optical means and/or in a direction perpendicular to the optical axis of said second optical means.

6. A double beam optical head according to claim 1, wherein said first optical means includes a light source, a collimating optical system for making the light beam emitted from the light source a parallel beam, and dividing means for dividing the light beam from the collimating optical system into a plurality of light beams, wherein the centers of the intensity distributions of two light beams from said first optical means are approximately symmetrically located with respect to the optical axis of said second optical means by inclining said light source with respect to the optical axis of said second optical means.

7. A double beam optical head according to claim 1, wherein said first optical means includes a light source for emitting a plurality of light beams and a collimating optical system for making the plurality of light beams emitted from the light source parallel beams, wherein the centers of the intensity distributions of two light beams from said first optical means are approximately symmetrically located with respect to the optical axis of said second optical means moving said light source and said collimating optical system in parallel in a direction perpendicular to the optical axis of said second optical means.

8. A double beam optical head according to claim 1, wherein said first optical means includes a light source for emitting a plurality of light beams, a collimating optical system for making the plurality of light beams emitted from said light source parallel beams, and a beam shaping optical system for shaping the light beams from said collimating optical system, wherein the centers of the intensity distributions of two light beams from said first optical means are approximately symmetrically located with respect to the optical axis of said second optical means by moving said beam shaping optical system.

9. A magneto-optical recording and/or reproducing apparatus comprising:

a magnetic head for irradiating the magneto-optical head comprising first optical means for emitting first and second light beams, and second optical means for focusing the first and second light beams from said first optical means on the magneto-optical recording medium to form a first light spot and a second light spot in association with the first and second light beams, respectively, wherein said first optical means is arranged such that the center of the intensity distribution of the first beam incident on said second optical means and the center of the intensity distribution of the second light beam incident on said second optical means are approximately symmetrically located with respect to the optical axis of said second optical means.

10. A magneto-optical recording and/or reproducing apparatus according to claim 9, wherein said second optical means is an objective lens.

11. A magneto-optical recording and/or reproducing apparatus according to claim 9, wherein said first optical means includes a light source, a collimating optical system for making the light beam emitted from the light source a parallel beam, and dividing means for dividing the light beam from the collimating optical system into a plurality of light beams, wherein the centers of the intensity distributions of two light beams from said first optical means are approximately symmetrically located with respect to the optical axis of said second optical means moving said light source and said collimating optical system in parallel in a direction perpendicular to the optical axis of said second optical means.

12. A magneto-optical recording and/or reproducing apparatus according to claim 9, wherein said first optical means includes a light source, a collimating optical system for making the light beam emitted from the light source a parallel beam, and dividing means for dividing the light beam from the collimating optical system into a plurality of light beams, wherein the centers of the intensity distributions of two light beams from said first optical means are approximately symmetrically located with respect to the optical axis of said second optical means by inclining said light source and said collimating optical systen with respect to the optical axis of said second opticals means.

13. A magneto-optical recording and/or reproducing apparatus according to claim 9, wherein said first optical means includes a light source, a collimating optical system for making the light beam emitted from the light source a parallel beam, dividing means for dividing the light beam from the collimating optical system into a plurality of light beams, and a beam shaping optical system for shaping the plurality of light beams from said dividing means, wherein the centers of the intensity distributions of two light beams from said first optical means are approximately symmetrically located with respect to the optical axis of said second optical means by moving said beam shaping optical system in a direction parallel to the optical axis of said second optical means and/or in a direction perpendicular to the optical axis of said second optical means.

14. A magneto-optical recording and/or reproducing apparatus according to claim 9, wherein said first optical means includes a light source, a collimating optical system for making the light beam emitted from the light source a parallel beam, and dividing means for dividing the light beam from the collimating optical system into a plurality of light beams, wherein the centers of the intensity distributions of two light beams from said first optical means are approximately symmetrically located with respect to the optical axis of said second optical means by inclining said light source with respect to the optical axis of said second optical means.

15. A magneto-optical recording and/or reproducing apparatus according to claim 9, wherein said first optical means includes a light source for emitting a plurality of light beams and a collimating optical system for making the plurality of light beams emitted from the light source parallel beams, wherein the centers of the intensity distributions of two light beams from said first optical means are approximately symmetrically located with respect to the optical axis of said second optical means by moving said light source and said collimating optical system in parallel in a direction perpendicular to the optical axis of said second optical means.

16. A magneto-optical recording and/or reproducing apparatus according to claim 9, wherein said first optical means includes a light source for emitting a plurality of light beams, a collimating optical system for making the plurality of light beams emitted from said light source parallel beams, and a beam shaping optical system for shaping the light beams from said collimating optical system, wherein the centers of the intensity distributions of two light beams from said first optical means are approximately symmetrically located with respect to the optical axis of said second optical means by moving said beam shaping optical means.

17. A method of forming a light spot on an optical information recording medium, comprising the steps of:

emitting first and second light beams from first optical means;

focusing the first and second light beams from the first optical means on the optical information recording medium to form first and second light spots respectively in association with the first and second light beams with second optical means; and arranging the first optical means such that the center of the intensity distribution of the first light beam incident on the second optical means and the center of the intensity distribution of the second light beam incident on the second optical means are approximately symmetrically located with respect to the optical axis of the second optical means.

18. A method according to claim 17, wherein the first optical means includes a light source, a collimating optical system for making the light beam emitted from the light source a parallel beam, and dividing means for dividing the light beam from the collimating optical system in to a plurality of light beams, wherein said method further comprises the sep of approximately symmetrically locating the centers of the intensity distributions of two light beams from the first optical means with respect to the optical axis of the second optical means by moving the light source and said collimating optical system in parallel in a direction perpendicular to the optical axis of the second optical means.

19. A method according to claim 17, wherein the first optical means includes a light source, a collimating optical system for making the light beam emitted from the light source a parallel beam, and dividing means for dividing the light beam from the collimating optical system into a plurality of light beams, wherein said method further comprises the step of approximately symmetrically locating the centers of the intensity distributions of two light beams from the first optical means with respect to the optical axis of the second optical means by inclining the light source and the collimating optical system with respect to the optical axis of the second optical means.

20. A method according to claim 17, wherein the first optical means includes a light source, a collimating optical system for making the light beam emitted from the light source a parallel beam, dividing means for dividing the light beam from the collimating optical system into a plurality of light beams, and a beam shaping optical system for shaping the plurality of light beams from said dividing means, wherein said method further comprises the step of approximately symmetrically locating the centers of the intensity distributions of two light beams from the first optical means with respect to the optical axis of the second optical means by moving the beam shaping optical system in a direction parallel to the optical axis of the second optical means and/or in a direction perpendicular to the optical axis of the second optical means.

21. A method according to claim 17, wherein the first optical means includes a light source, a collimating optical system for making the light beam emitted from the light source a parallel beam, and dividing means for dividing the light beam from the collimating optical system into a plurality of light beams, wherein said method further comprises the step of approximately symmetrically locating the centers of the intensity distributions of two light beams from the first optical means with respect to the optical axis of the second optical means by inclining the light source with respect to the optical axis of the second optical means.

22. A method according to claim 17, wherein the first optical means includes a light source for emitting a plurality of light beams and a collimating optical system for making the plurality of light beams emitted from the light source parallel beams, wherein said method further comprises the step of approximately symmetrically locating the centers of the intensity distributions of two light beams from the first optical means with respect to the optical axis of the second optical means by moving the light source and the collimating optical system in parallel in a direction perpendicular to the optical axis of the second optical means.

23. A method according to claim 17, wherein the first optical means includes a light source for emitting a plurality of light beams, a collimating optical system for making the plurality of light beams emitted from the light source parallel beams, and a beam shaping optical system for shaping the light beams from the collimating optical system, wherein said method further comprises the step of approximately symmetrically locating the centers of the intensity distributions of two light beams from the first optical means with respect to the optical axis of the second optical means by moving the beam shaping optical system.

\* \* \* \* \*

UNITED STATES PATENT AND TRADEMARK OFFICE
CERTIFICATE OF CORRECTION

PATENT NO. : 5,521,897
DATED : May 28, 1996
INVENTOR(S) : KOICHIRO NISHIKAWA

It is certified that error appears in the above-indentified patent and that said Letters Patent is hereby corrected as shown below:

ON THE COVER PAGE,
 item
 [56] References Cited

U.S. PATENT DOCUMENTS

"Eado" should read --Endo--.

COLUMN 1

Line 12, "or" should read --on--.
 Line 18, "has" should read --have--.

COLUMN 4

Line 14, "is" should be deleted.

COLUMN 7

Line 34, "a magnetic head for irradiating the magneto-optical head" should read --a magnetic head for applying a magnetic field to a magneto-optical recording medium; and an optical head for irradiating the magneto-optical recording medium with light beams, said optical head--.

COLUMN 8

Line 10, "opticals" should read --optical--.
 Line 60, "from" should read --with--.

UNITED STATES PATENT AND TRADEMARK OFFICE
CERTIFICATE OF CORRECTION

PATENT NO. : 5,521,897
DATED : May 28, 1996
INVENTOR(S) : KOICHIRO NISHIKAWA

It is certified that error appears in the above-indentified patent and that said Letters Patent is hereby corrected as shown below:

<u>COLUMN 9</u>

Line 12, "in to" should read --into--.
Line 14, "sep" should read --step--.

Signed and Sealed this

Twelfth Day of November, 1996

Attest:

BRUCE LEHMAN

Attesting Officer    Commissioner of Patents and Trademarks